US012640579B2

(12) United States Patent　　　　(10) Patent No.:　US 12,640,579 B2
Kanekiyo et al.　　　　　　　　　　(45) Date of Patent:　　May 26, 2026

(54) POWER SUPPLY/DEMAND DEVICE, POWER GENERATION SYSTEM, AND CONTROL METHOD

(71) Applicant: KABUSHIKI KAISHA TOSHIBA, Tokyo (JP)

(72) Inventors: Yasuhiro Kanekiyo, Yokohama Kanagawa (JP); Kenichirou Ogawa, Kawasaki Kanagawa (JP); Tetsu Shijo, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 705 days.

(21) Appl. No.: 18/183,351

(22) Filed: Mar. 14, 2023

(65) Prior Publication Data

US 2024/0097472 A1　　Mar. 21, 2024

(30) Foreign Application Priority Data

Sep. 15, 2022　(JP) ................................. 2022-146936

(51) Int. Cl.
H02J 7/00　　(2026.01)
H02J 7/14　　(2006.01)
H02J 7/34　　(2006.01)

(52) U.S. Cl.
CPC ........ H02J 7/00712 (2020.01); H02J 7/0048 (2020.01); H02J 7/0063 (2013.01); H02J 7/34 (2013.01); H02J 2207/20 (2020.01)

(58) Field of Classification Search
CPC .... H02J 7/00712; H02J 7/0048; H02J 7/0063; H02J 7/34; H02J 2207/20

USPC ......................................................... 320/132
See application file for complete search history.

(56) References Cited

U.S. PATENT DOCUMENTS

| 2011/0245987 | A1 | 10/2011 | Pratt et al. | |
| 2015/0045974 | A1 | 2/2015 | Behrangrad | |
| 2015/0298568 | A1* | 10/2015 | Mitsutani | B60L 58/13 |
| | | | | 180/65.21 |

(Continued)

FOREIGN PATENT DOCUMENTS

| JP | 2013085412 A | 5/2013 |
| JP | 2016220352 A | 12/2016 |

(Continued)

OTHER PUBLICATIONS

Japanese Office Action (and an English language translation thereof) dated Jul. 15, 2025, issued in counterpart Japanese Application No. 2022-146936.

*Primary Examiner* — Alexis B Pacheco

(74) *Attorney, Agent, or Firm* — Holtz, Holtz & Volek PC

(57) ABSTRACT

According to one embodiment, a power supply/demand device includes a virtual synchronous inverter and a storage battery. The virtual synchronous inverter is connected to a power system. Charging and discharging of the storage battery are controlled by the virtual synchronous inverter. The virtual synchronous inverter is connected to the power system in parallel with other inverters. The virtual synchronous inverter is capable of calculating a first standby time having any length and performing control of the storage battery corresponding to an operation instruction after a lapse of the first standby time, when receiving the operation instruction accompanied by output of power to the power system or input of power from the power system.

18 Claims, 4 Drawing Sheets

(56) References Cited

U.S. PATENT DOCUMENTS

| | | | |
|---|---|---|---|
| 2016/0329716 A1 | 11/2016 | Inoue | |
| 2017/0331372 A1* | 11/2017 | Miki | H02M 3/157 |
| 2023/0012020 A1* | 1/2023 | Jiang | H02J 50/20 |
| 2023/0069509 A1* | 3/2023 | Izumi | H02J 7/007194 |
| 2023/0075738 A1 | 3/2023 | Ishihara | |
| 2023/0158915 A1* | 5/2023 | Zhou | H02J 7/007182 |
| | | | 320/109 |
| 2023/0402851 A1* | 12/2023 | Babu | H02J 3/0012 |
| 2024/0006891 A1* | 1/2024 | Liu | H02J 3/381 |
| 2024/0039285 A1* | 2/2024 | Lin | H02J 3/38 |
| 2024/0275165 A1* | 8/2024 | Fujii | H02J 3/32 |
| 2024/0275301 A1* | 8/2024 | Fujii | H02J 3/32 |
| 2024/0383362 A1* | 11/2024 | Okazaki | B60L 53/14 |
| 2025/0062709 A1* | 2/2025 | Lund | H02P 21/18 |
| 2025/0118964 A1* | 4/2025 | Ho | H02J 7/0042 |

FOREIGN PATENT DOCUMENTS

| | | | |
|---|---|---|---|
| JP | 2021097530 A | 6/2021 | |
| WO | 2014097608 A1 | 6/2014 | |
| WO | 2015107706 A1 | 7/2015 | |
| WO | 2021199125 A1 | 10/2021 | |

* cited by examiner

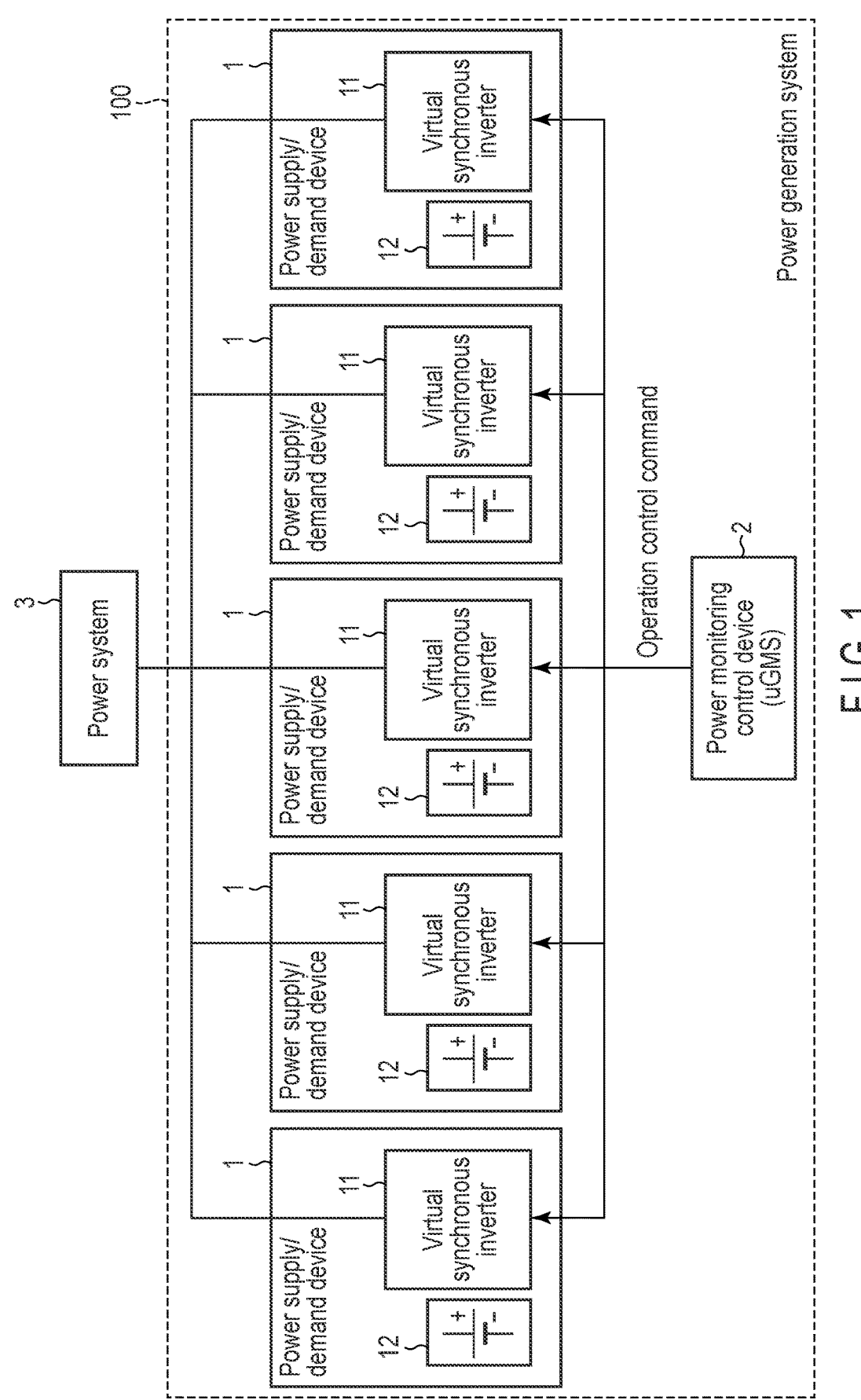
F I G. 1

POWER SUPPLY/DEMAND DEVICE, POWER GENERATION SYSTEM, AND CONTROL METHOD

CROSS-REFERENCE TO RELATED APPLICATIONS

This application is based upon and claims the benefit of priority from Japanese Patent Application No. 2022-146936, filed Sep. 15, 2022, the entire contents of which are incorporated herein by reference.

FIELD

Embodiments described herein relate generally to a power supply/demand device, a power generation system, and a control method.

BACKGROUND

A power supply/demand device such as a virtual synchronous generator, a virtual synchronous inverter, or a virtual synchronous power conditioner having a power adjustment force (synchronizing force) similar to that of a synchronous generator corrects output power instructed from a control device according to a difference between a system frequency of a power system and a system standard frequency, and adjusts the output power based on the corrected power to operate.

For this reason, in a power generation system configured by connecting a plurality of the power supply/demand devices in parallel, an adjusted amount pf power (corrected amount of power) increases according to the number of the parallel devices, and the operation thereof is an operation with power variations in which a change amount of the output power is large. When the difference between the system frequency and the system standard frequency is large, the corrected amount of power increases, and thus, a large power fluctuation occurs when the operation starts or the like.

The large power fluctuation destabilizes the power generation system. For example, when a dynamic exceeding the rating occurs, a protective device operates, and a phenomenon in which power supply is not stabilized occurs. In this manner, it is concerned that the large power fluctuation may lead to a power outage in the power generation system.

Further, in a power generation system in which a plurality of grid-connected inverters or grid-connected power conditioners are connected in parallel and operated in parallel, the operation control of the entire power generation system is performed by a method of connecting control synchronization signal lines between the respective grid-connected inverters and grid-connected power conditioners to synchronize operations and to interconnect control or a method of connecting control synchronization signal lines between a power management device (μGMS) that controls the operation of the entire power generation system and each of the grid-connected inverters or the grid-connected power conditioners to synchronize operations and to interconnect control.

In any method of the power generation system, the system includes one grid-connected inverter, grid-connected power conditioner, or power management device serving as a master that is the center of the operation of the entire system, and the remaining grid-connected inverter or grid-connected power conditioner serving as a slave that operates according to an instruction from the master, and the power supply/ demand device is operated in connection with the power system by measuring a voltage and a frequency of the power system.

In a power generation system using a grid-connected inverter or a grid-connected power conditioner which includes one master and a plurality of slaves, a synchronous operation signal is not transmitted when a control synchronization signal line is disconnected. Then, the synchronous operation of the grid-connected inverter and the grid-connected power conditioner is no longer performed, so that the entire power generation system becomes unstable and a power outage occurs.

Similarly, when the grid-connected inverter, the grid-connected power conditioner, or the power management device serving as the master fails, what controls the devices constituting the system disappears so that the entire power generation system becomes unstable to cause the power outage.

That is, in any of the methods of the power generation system described above, propagation of a control synchronization signal is interrupted due to the disconnection of the control synchronization signal line or the failure of the master device. As a result, the entire power generation system becomes unstable, and the power outage occurs.

In a power generation system using a virtual synchronous generator, a virtual synchronous inverter, a virtual synchronous power conditioner, or the like instead of the grid-connected inverter or the grid-connected power conditioner, an amount of generated power of each power device changes depending on a state of a power system, a simultaneous operation instruction by a control synchronization signal from a master causes a large change of instantaneous power when the system starts to operate or starts an operation according to a change in a power supply/demand amount.

The large change of instantaneous power induces the operation of the power generation system or the constituent power device to an unstable state due to fluctuations of the generated power, so that a protective device operates. The operation of the protective device causes the power outage in the power generation system.

In this manner, in the power generation system in which the master device instructs the simultaneous operation of the control synchronization signal using the control synchronization signal line, the entire power generation system becomes unstable to cause the power outage when the control synchronization signal line is disconnected or the master device fails. Further, when power generation system is constructed using the power supply/demand device having the synchronizing force, there is a possibility that a large power fluctuation occurs at the start of the operation or the like, and when the large power fluctuation occurs, the entire power generation system becomes unstable to cause the power outage.

BRIEF DESCRIPTION OF THE DRAWINGS

FIG. 1 is a diagram illustrating an example of a configuration of a power generation system according to an embodiment.

DETAILED DESCRIPTION

Figure 2:
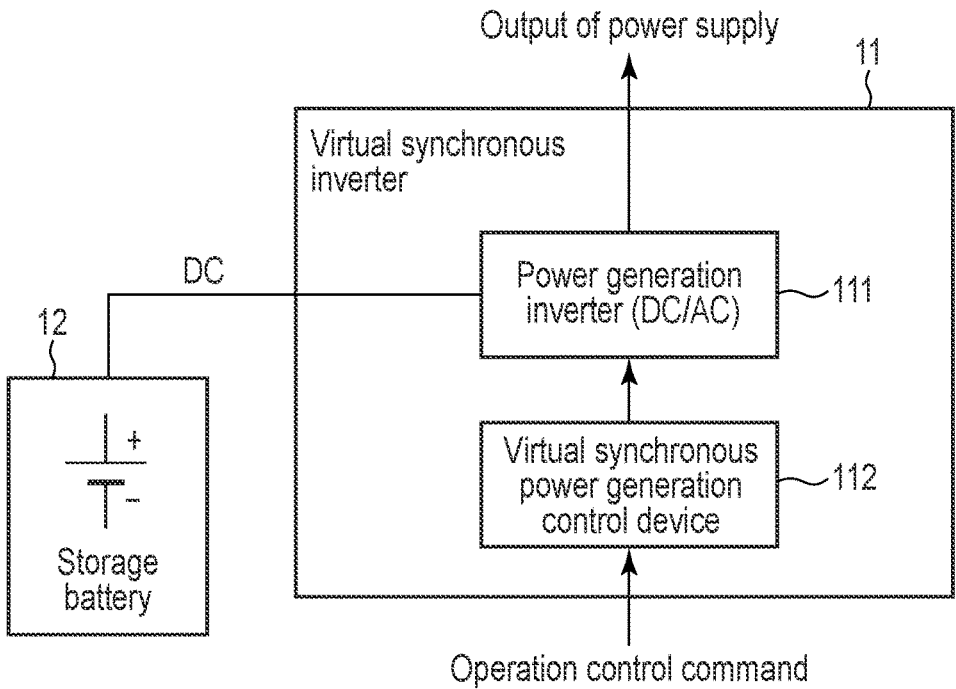
FIG. 2 is a diagram illustrating an example of a configuration of a virtual synchronous inverter included in a power supply/demand device in the power generation system according to the embodiment.

Embodiments will be described hereinafter with reference to the accompanying drawings.

In general, according to one embodiment, a power supply/demand device includes a virtual synchronous inverter and a storage battery. The virtual synchronous inverter is connected to a power system. Charging and discharging of the storage battery are controlled by the virtual synchronous inverter. The virtual synchronous inverter is connected to the power system in parallel with other inverters. The virtual synchronous inverter is capable of calculating a first standby time having any length and performing control of the storage battery corresponding to an operation instruction after a lapse of the first standby time, when receiving the operation instruction accompanied by output of power to the power system or input of power from the power system.

FIG. 1 is a diagram illustrating an example of a configuration of a power generation system 100 according to the embodiment.

As illustrated in FIG. 1, the power generation system 100 of the embodiment includes a plurality of power supply/demand devices 1 and a power monitoring control device (μGMS) 2.

The power supply/demand device 1 includes a virtual synchronous inverter 11 and a storage battery 12. A plurality of the virtual synchronous inverters 11 respectively mounted on the plurality of power supply/demand devices 1 in the power generation system 100 are connected in parallel with a power system 3. The virtual synchronous inverter 11 is an inverter having a simulated inertia function simulating inertia that autonomously reduces a frequency change of a synchronous generator. The virtual synchronous inverter 11 implements the simulated inertia function by monitoring a frequency of the power system 3 to detect the frequency change and simulating inertia generated by a behavior of hardware such as a rotor in the synchronous generator by software.

The power monitoring control device 2 controls the entire power generation system 100, and simultaneously transmits operation control commands to the plurality of virtual synchronous inverters 11. The operation control commands include a start of charging or discharging of the storage battery 12 whose charging or discharging is being stopped, a stop of charging or discharging of the storage battery 12 that is being charged or discharged, a change of an amount of charging or discharging power, non-charging/non-discharging (setting the amount of charging or discharging power to 0), and the like. The power monitoring control device 2 transmits these operation control commands to the plurality of virtual synchronous inverters 11 for the purpose of stabilizing the frequency of the power system 3. Note that the operation control command for non-charging or non-discharging (setting the amount of charging or discharging power to 0) with respect to the storage battery 12 being charged or discharged is one of instructions necessary for stabilizing the frequency of the power system 3, which is different from the stop of charging or discharging of the storage battery 12 that is being charged or discharged.

The frequency of the power system 3 rises and falls when the balance between supply and demand is lost. Specifically, the frequency increases when a demand amount of power falls below a supply amount (the supply amount is excessive), and the frequency decreases when the demand amount exceeds the supply amount (the supply amount is insufficient).

For example, when the demand amount of power exceeds the supply amount and the frequency of the power system 3 decreases, in the power generation system 100, first, the simulated inertia function of the virtual synchronous inverter 11 is activated to reduce a rate of change of frequency (RoCoF) (response by inertia). Subsequently, the virtual synchronous inverter 11 autonomously performs an operation of compensating insufficient power within a possible range based on the frequency of the power system 3 (a primary adjustment force). Thereafter, upon receiving the operation control command from the power monitoring control device 2, the virtual synchronous inverter 11 executes an operation according to the command (a secondary adjustment force). That is, each of the plurality of virtual synchronous inverters 11 in the power generation system 100 operates independently without cooperating with the other virtual synchronous inverters 11.

When operating in response to the operation control command from the power monitoring control device 2, the virtual synchronous inverter 11 corrects an amount of power indicated by the operation control command according to a difference between a system frequency of the power system 3 and a system standard frequency. In a case where the difference between the system frequency and the system standard frequency is large, the corrected amount of power also increases, and an amount of power output from the virtual synchronous inverter 11 is greatly different from the amount of power indicated by the operation control command.

Here, when the plurality of virtual synchronous inverters 11 are connected in parallel with the power system 3 as in the power generation system 100 of the embodiment, a correction amount is a multiple of the number of the virtual synchronous inverters 11. Therefore, when the plurality of virtual synchronous inverters 11 having received the operation control commands from the power monitoring control device 2 operate simultaneously, a large change in an amount of instantaneous power occurs, and there is a possibility that a protective device operates to cause a power outage in some cases.

Therefore, the power generation system 100 of the embodiment includes a mechanism for suppressing a change amount of instantaneous power generated according to the difference between the system frequency of the power system 3 and the standard frequency, and this point will be described in detail hereinafter.

Note that the storage batteries 12 included in the plurality of power supply/demand devices 1 in the power generation system 100 illustrated in FIG. 1 may have mutually different storable capacities. Although FIG. 1 illustrates an example in which all of the plurality of power supply/demand devices 1 in the power generation system 100 include the virtual synchronous inverters 11, respectively, the power supply/demand device 1 may include a virtual power conditioner. The power supply/demand device 1 including the virtual synchronous inverter 11 and the power supply/demand device 1 including the virtual power conditioner may be provided together in the power generation system 100.

FIG. 2 is a diagram illustrating an example of a configuration of the virtual synchronous inverter 11.

As illustrated in FIG. 2, the virtual synchronous inverter 11 includes a power generation inverter 111 and a virtual synchronous power generation control device 112.

The power generation inverter 111 converts DC power supplied from the storage battery 12 into AC power under the control of the virtual synchronous power generation control device 112. The AC power obtained by the power generation inverter 111 is output to the power system 3.

The virtual synchronous power generation control device 112 controls the power generation inverter 111 based on the operation control command from the power monitoring control device 2. For example, the virtual synchronous power generation control device 112 controls an amount of output power of the power generation inverter 111. The amount of output power also includes zero. The virtual synchronous power generation control device 112 can also control a charging or discharging start and a charging or discharging stop of the storage battery 12. The virtual synchronous power generation control device 112 also executes control of the power generation inverter 111 for implementing the above-described simulated inertia function. Further, the virtual synchronous power generation control device 112 also executes control of the power generation inverter 111 for implementing the above-described autonomous operation of compensating insufficient power within the possible range regardless of the operation control command.

In the case of the power supply/demand device 1 including the storage battery 12, it is possible to cope with a case where a demand amount of power falls below a supply amount and a frequency of the power system 3 increases. That is, it is possible to perform an operation of taking in surplus power to charge the storage battery 12 such that the system frequency of the power system 3 approaches the standard frequency.

Figure 3:
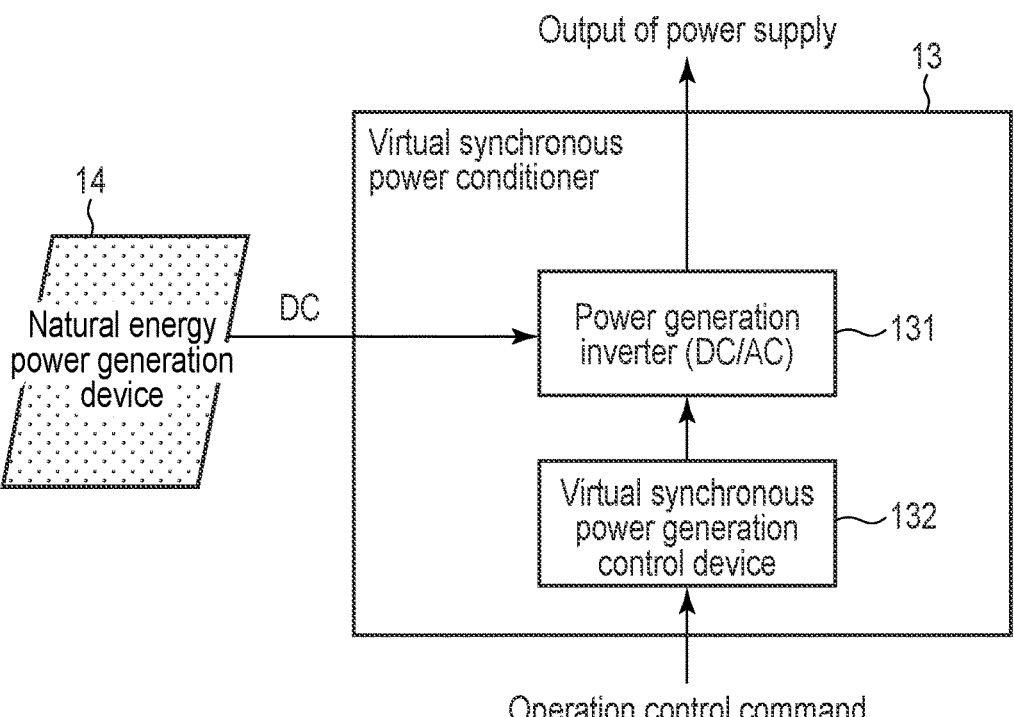
FIG. 3 is a diagram illustrating an example of a configuration of a virtual synchronous power conditioner in a case where the power supply/demand device in the power generation system according to the embodiment includes the virtual synchronous power conditioner.

FIG. 3 is a diagram illustrating an example of a configuration of a virtual synchronous power conditioner 13 when the power supply/demand device 1 includes the virtual synchronous power conditioner 13 instead of the virtual synchronous inverter 11.

The virtual synchronous power conditioner 13 includes a power generation inverter 131 and a virtual synchronous power generation control device 132, which is similar to the virtual synchronous inverter 11.

Under the control of the virtual synchronous power generation control device 132, the power generation inverter 131 converts DC power supplied from a natural energy power generation device 14 such as a solar power generation panel into AC power. The AC power obtained by the power generation inverter 131 is output to the power system 3.

The virtual synchronous power generation control device 132 controls the power generation inverter 131 based on the operation control command from the power monitoring control device 2. For example, the virtual synchronous power generation control device 132 controls an amount of output power of the power generation inverter 131. The amount of output power also includes zero. The virtual synchronous power generation control device 132 also executes control of the power generation inverter 131 for implementing the above-described simulated inertia function. Further, the virtual synchronous power generation control device 132 also executes control of the power generation inverter 131 for implementing the above-described autonomous operation of compensating insufficient power within the possible range regardless of the operation control command.

Next, the mechanism for suppressing the change amount of instantaneous power generated according to the difference between the system frequency of the power system 3 and the standard frequency included in the power generation system 100 of the embodiment will be described.

Here, a case is assumed in which a demand amount of power exceeds a supply amount and a frequency of the power system 3 decreases. When receiving an operation control command for outputting power to the power system 3 (discharging the storage battery 12) from the power monitoring control device 2, the virtual synchronous inverter 11 in the power generation system 100 of the embodiment calculates a random operation standby time for controlling an operation start time. After calculating the operation standby time, the virtual synchronous inverter 11 waits for a start of an operation corresponding to the operation control command until the operation standby time elapses. At this time, the virtual synchronous inverter 11 measures a frequency of the power system 3 and stores the value thereof. Further, the virtual synchronous inverter 11 continues the control of the storage battery 12, which has been performed at a point in time of receiving the operation control command, during standby. That is, the virtual synchronous inverter 11 continues to maintain a state of the power supply/demand device 1 at the point in time of receiving the operation control command during standby. This prevents the frequency of the power system 3 from being changed by its own action of the virtual synchronous inverter 11 before the operation standby time elapses.

The virtual synchronous inverter 11 continuously measures a frequency of the power system 3 even during standby. The virtual synchronous inverter 11 compares the frequency of the power system 3 measured and stored when the operation control command is received with the frequency of the power system 3 measured during standby. If another virtual synchronous inverter 11 (for which an operation standby time shorter than that of the virtual synchronous inverter 11 has been calculated) starts an operation during standby of the virtual synchronous inverter 11, a difference is generated between these two frequencies. Further, a difference also occurs between these two frequencies due to a change in the demand amount or supply amount of power.

The virtual synchronous inverter 11 starts the operation corresponding to the operation control command when the operation standby time elapses without causing a difference equal to or larger than a predetermined value between these two frequencies. Here, the predetermined value is a threshold for suppressing occurrence of a large change in an amount of instantaneous power. If the difference is smaller than the predetermined value, the virtual synchronous inverter 11 can start the operation even if another virtual synchronous inverter 11 starts an operation during standby of the virtual synchronous inverter 11. The predetermined value may be set to a value different for each of the power supply/demand devices 1 according to performance such as input or output capability of power. Further, the predetermined value may be dynamically set according to the difference between the frequency of the power system 3 measured when the operation control command is received and the standard frequency of the power system 3. Further, the predetermined value may be dynamically updated according to the difference between the frequency of the power system 3 measured during standby and the standard frequency of the power system 3. For example, the predetermined value may be set and updated such that the value decreases as the measured frequency of the power system 3 is closer to the standard frequency of the power system 3.

On the other hand, when a difference equal to or larger than the predetermined value occurs between the stored frequency of the power system 3 and the frequency of the power system 3 measured during standby, the virtual synchronous inverter 11 calculates a random operation standby time again and measures and stores a frequency of the power system 3, similarly to when the operation control command is received. In other words, the frequency of the power system 3 to be stored is updated, and standby for the operation standby time that has been calculated again is started from the beginning.

Hereinafter, as described above, the virtual synchronous inverter 11 continuously measures a frequency of the power system 3 even during standby, and starts the operation corresponding to the operation control command when the operation standby time elapses without causing a difference equal to or larger than the predetermined value between the two frequencies. On the other hand, when a difference equal to or larger than the predetermined value occurs between the two frequencies, the virtual synchronous inverter 11 calculates an operation standby time again, measures and stores a frequency of the power system 3, and starts standby for the operation standby time.

In this manner, in the power generation system 100 of the embodiment, the respective virtual synchronous inverters 11 of the plurality of power supply/demand devices 1 in the power generation system 100 calculate random operation standby times to control the operation start time instead of simultaneously starting the operation when receiving the operation control commands from the power monitoring control device 2. As a result, the power generation system 100 of the embodiment suppresses the occurrence of the large change in the amount of instantaneous power.

Further, the virtual synchronous inverter 11 continuously measures the frequency of the power system 3 even during standby, and compares the frequency with the frequency of the power system 3 measured and stored when receiving the operation control command. If a difference equal to or larger than the predetermined value occurs between the two frequencies, the virtual synchronous inverter 11 calculates an operation standby time again, measures and stores a frequency of the power system 3, and starts standby for the operation standby time.

Since the frequency of the power system 3 can change from moment to moment, the virtual synchronous inverter 11 prevents occurrence of overcompensation of power or the like due to an effect of providing the operation standby time by performing the above operation during standby.

The virtual synchronous inverter 11 periodically measures an amount of input or output power of the power supply/demand device 1 in order to control the storage battery 12 so as to stabilize the amount of input or output power of the power supply/demand device 1. More specifically, the virtual synchronous inverter 11 controls the storage battery 12 such that the amount of input or output power of the power supply/demand device 1 converges to an average value by periodic measurement. Therefore, the virtual synchronous inverter 11 calculates the above-described operation standby time to be a time longer than a control time of the storage battery 12 for stabilizing the amount of input or output power of the power supply/demand device 1. This is because the control of the storage battery 12 for stabilizing the amount of input or output power of the power supply/demand device 1 is adversely affected if the operation standby time shorter than the control time of the storage battery 12 for stabilizing the amount of input or output power of the power supply/demand device 1 is calculated and the virtual synchronous inverter 11 starts the operation corresponding to the operation control command.

Further, the virtual synchronous inverter 11 may use an amount of stored power of the storage battery 12 as a variable as a method for calculating a random operation standby time. For example, a calculation formula that has a high probability of calculating a shorter operation standby time as the amount of stored power of the storage battery 12 is larger may be applied when an operation control command for outputting power to the power system 3 (discharging the storage battery 12) is received, and a calculation formula that has a high probability of calculating a shorter operation standby time as the amount of stored power of the storage battery 12 is smaller may be applied when an operation control command for inputting power from the power system 3 (charging the storage battery 12) is received.

For example, in a case where standby for an operation start is an operation of subtracting a counter, the standby is ended when a value of the counter becomes zero, and an operation corresponding to an operation control command is started, the following two formulas may be used assuming that a value indicating the amount of stored power of the storage battery 12 is 0 at a minimum and 1 at a maximum.

$$\text{In case of discharging storage battery 12 Operation standby time} = (1 - \text{amount of stored power of storage battery 12}) \times [\text{randomly generated standby time}] + n \quad (n\text{: minimum value of standby time}) \qquad \text{Formula 1}$$

$$\text{In case of charging storage battery 12 Operation standby time} = (\text{amount of stored power of storage battery 12}) \times [\text{randomly generated standby time}] + n \quad (n\text{: minimum value of standby time}) \qquad \text{Formula 2}$$

Figure 4:
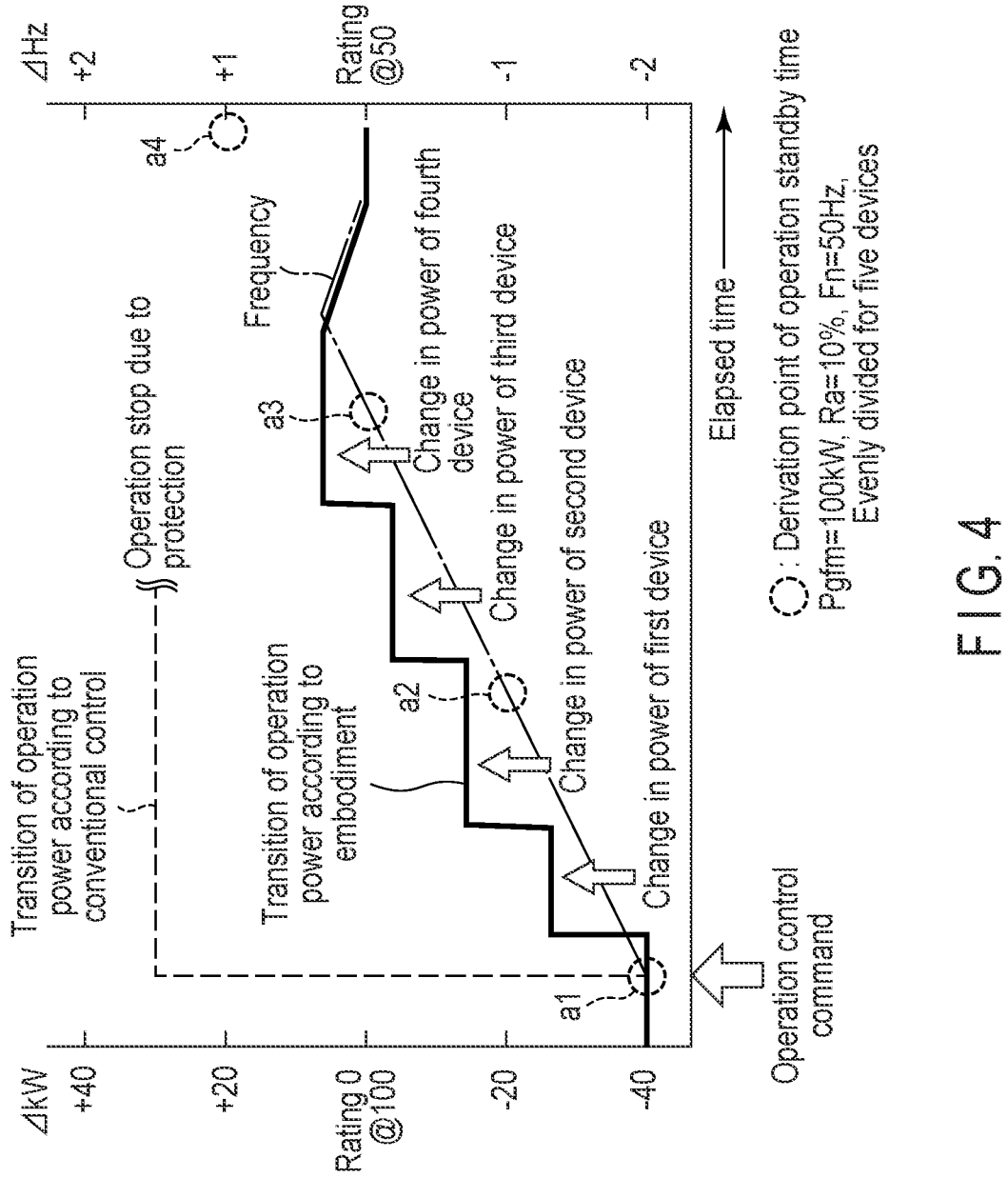
FIG. 4 is a diagram illustrating an example of a transition of operation power in the power generation system according to the embodiment.

FIG. 4 is a diagram illustrating an example of a transition of operation power in the power generation system 100 according to the embodiment. Here, a case is assumed in which a demand amount of power exceeds a supply amount, a frequency of the power system 3 decreases, and an operation control command for outputting power (discharging the storage battery 12) from the power monitoring control device 2 to the power system 3 is sent to the virtual synchronous inverter 11. Further, it is assumed that the power generation system 100 includes five power supply/demand devices 1 having the same performance. That is, it is assumed that the same value is set in the five power supply/demand devices 1 as the above-described predetermined value that is the threshold for suppressing the occurrence of the large change in the amount of instantaneous power.

In FIG. 4, the horizontal axis represents an elapsed time. The left vertical axis represents an output power value of the power generation system 100 by a difference from the rating. The right vertical axis represents the frequency of the power system 3 by a difference from the rating.

Reference signs a1 to a3 denote derivation points of operation standby times. When receiving the operation control command from the power monitoring control device 2, the virtual synchronous inverter 11 calculates an operation standby time (a1) and waits for a start of an operation for the operation standby time. Further, the virtual synchronous inverter 11 measures and stores a frequency of the power system 3 at a point in time of the reference sign a1. Conventionally, virtual synchronous inverters having received operation control commands from a power monitoring control device simultaneously start an operation, high power is output from a power generation system, and a protective device operates if the rating is far exceeded.

In the example illustrated in FIG. 4, first, the virtual synchronous inverter 11 that has calculated the first shortest operation standby time starts the operation corresponding to the operation control command, and power output from the first power supply/demand device 1 is started. It is assumed that a difference equal to or larger than a predetermined frequency from the frequency of the power system 3 at the point in time of the reference sign a1 is not caused by the start of the power output from the first power supply/demand device 1.

Subsequently, the virtual synchronous inverter 11 having calculated the second shortest operation standby time starts the operation corresponding to the operation control command, and power output from the second power supply/demand device 1 is started. It is assumed that a difference equal to or larger than the predetermined frequency from the frequency of the power system 3 at the point in time of the reference sign a1 occurs when the power output from the second power supply/demand device 1 is started in addition to the first power supply/demand device 1.

The remaining three virtual synchronous inverters 11 on standby other than the two virtual synchronous inverters 11 that have started the operation calculate operation standby times again (a2), and measure and store a frequency of the power system 3 at a point in time of the reference sign a2. Thereafter, the virtual synchronous inverter 11 having calculated the first shortest operation standby time indicated by the reference sign a2 starts the operation corresponding to the operation control command, and power output from the third power supply/demand device 1 is started. It is assumed that a difference equal to or larger than a predetermined frequency from the frequency of the power system 3 at the point in time of the reference sign a2 is not caused by the start of the power output from the third power supply/demand device 1.

Subsequently, the virtual synchronous inverter 11 having calculated the second shortest operation standby time starts the operation corresponding to the operation control command, and power output from the fourth power supply/demand device 1 is started. It is assumed that a difference equal to or larger than the predetermined frequency from the frequency of the power system 3 at the point in time of the reference sign a2 occurs when the power output from the fourth power supply/demand device 1 is started in addition to the third power supply/demand device 1.

The remaining virtual synchronous inverter 11 on standby other than the four virtual synchronous inverters 11 that have started the operation calculate an operation standby time again (a3), and measure and store a frequency of the power system 3 at a point in time of the reference sign a3. Thereafter, it is assumed that the operation standby time calculated by the virtual synchronous inverter 11 of the fifth power supply/demand device 1 has elapsed at a point in time of the reference sign a4. The virtual synchronous inverter 11 of the fifth power supply/demand device 1 that has started the operation at the point in time of the reference sign a4 determines that power output to the power system 3 is unnecessary based on the frequency of the power system 3. The virtual synchronous inverter 11 controls the storage battery 12 so as not to perform charging or discharging (to set an amount of charging or discharging power to zero).

In this manner, the amount of output power after receiving the operation control command from the power monitoring control device 2 changes so as to increase stepwise in the power generation system 100 of the embodiment. That is, the power generation system 100 of the embodiment can suppress the change amount of instantaneous power generated according to the difference between the system frequency of the power system 3 and the standard frequency.

Note that FIG. 4 assumes the case in which the demand amount of power exceeds the supply amount, the frequency of the power system 3 decreases, and the operation control command for outputting power (discharging the storage battery 12) from the power monitoring control device 2 to the power system 3 is sent to the virtual synchronous inverter 11. Conversely, in a case where the demand amount of power falls below the supply amount, the frequency of the power system 3 increases, and the operation control command for inputting power (charging the storage battery 12) from the power monitoring control device 2 to the power system 3 is sent to the virtual synchronous inverter 11, an amount of input power after receiving the operation control command from the power monitoring control device 2 transitions so as to increase stepwise in the power generation system 100 of the embodiment.

Further, the virtual synchronous inverter 11 monitors the frequency of the power system 3 in order to implement the simulated inertia function, and thus, may predict an operation control command that is to be sent from the power monitoring control device 2. When receiving an operation control command contrary to the prediction from the power monitoring control device 2, the virtual synchronous inverter 11 immediately executes an operation corresponding to the operation control command in deference to the operation control command from the power monitoring control device 2. For example, when an operation control command indicating charging of the storage battery 12 is received contrary to the prediction in a situation where the frequency of the power system 3 is decreasing (power is insufficient), the virtual synchronous inverter 11 omits calculation and standby of an operation standby time and starts control for charging the storage battery 12. Since such an operation control command is considered to be intended for a special purpose, it is preferable to immediately execute the operation control command.

Figure 5:
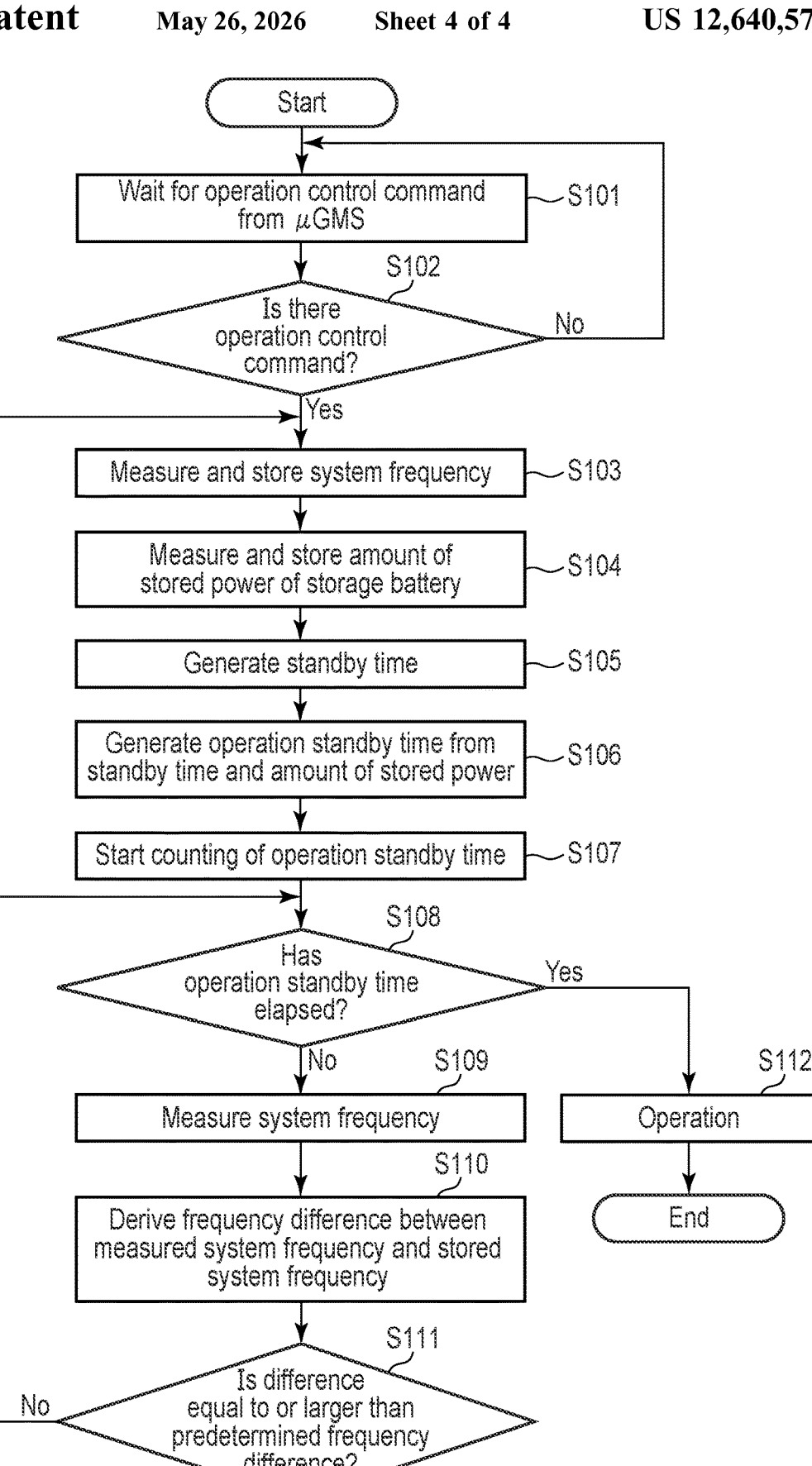
FIG. 5 is a flowchart illustrating an example of an operation procedure of the virtual synchronous inverters of the plurality of power supply/demand devices in the power generation system according to the embodiment.

FIG. 5 is a flowchart illustrating an example of an operation procedure of the virtual synchronous inverters 11 of the plurality of power supply/demand devices 1 in the power generation system 100 according to the embodiment.

The virtual synchronous inverter 11 waits for an operation control command from the power monitoring control device (μGMS) (S101). When receiving the operation control command (S102: Yes), the virtual synchronous inverter 11 measures and stores a frequency of the power system 3 (S103). The virtual synchronous inverter 11 measures and stores an amount of stored power of the storage battery 12 (S104). Further, the virtual synchronous inverter 11 generates a random standby time (S105). Here, the standby time generated in S105 is a variable ([randomly generated standby time]) in the above-described calculation formulas (Formula 1 and Formula 2) for an operation standby time. Note that S103 to S105 may be executed sequentially, or two or more thereof may be executed in parallel.

Next, the virtual synchronous inverter 11 generates an operation standby time for waiting for a start of an operation corresponding to the operation control command using the standby time generated in S105 and the amount of stored power measured and stored in S104 (S106). Then, the virtual synchronous inverter 11 starts counting (countdown) of the generated operation standby time (S107).

Thereafter, the virtual synchronous inverter 11 determines whether or not the operation standby time has elapsed (S108). When the operation standby time has not elapsed (S108: No), the virtual synchronous inverter 11 measures a frequency of the power system 3 (S109). Then, the virtual synchronous inverter 11 calculates a frequency difference between the frequency of the power system 3 measured in S109 and the frequency of the power system 3 measured and stored in S103 (S110).

When the frequency difference calculated in S110 is smaller than a predetermined value (S111: No), the virtual synchronous inverter 11 returns to S108. On the other hand, when the frequency difference is equal to or larger than the predetermined value (S111: Yes), the virtual synchronous inverter 11 returns to S103. That is, the virtual synchronous inverter 11 continues to stand by with the stored frequency of the power system 3 as it is when the frequency difference calculated in S110 is smaller than the predetermined value (S111: No), or alternatively, updates a frequency of the power system 3 to be stored to a value at the point in time when the frequency difference is equal to or larger than the predetermined value (S111: Yes), generates an operation standby time again, and starts to stand by from the beginning.

A case where it is determined in S108 that the operation standby time has elapsed is a case where the frequency difference between the frequency of the power system 3 measured in S109 and the frequency of the power system 3 measured and stored in S103 does not become equal to or larger than the predetermined value during standby of the operation standby time generated in S106. When the operation standby time has elapsed (S108: Yes), the virtual synchronous inverter 11 starts the control of the storage battery 12 corresponding to the operation control command (S112).

As described above, in the power generation system 100 of the embodiment, the respective virtual synchronous inverters 11 of the plurality of power supply/demand devices 1 in the power generation system 100 calculate random operation standby times to control the operation start time instead of simultaneously starting the operation when receiving the operation control commands from the power monitoring control device 2. As a result, the power generation system 100 of the embodiment suppresses the occurrence of the large change in the amount of instantaneous power.

That is, the power generation system 100 of the embodiment can suppress the change amount of instantaneous power generated according to the difference between the system frequency of the power system 3 and the standard frequency.

Note that the example in which the power monitoring control device 2 simultaneously transmits the operation control signals to the plurality of virtual synchronous inverters 11 has been illustrated in the above description. However, a method of the embodiment in which the virtual synchronous inverters 11 calculate operation standby times at the time of receiving the operation control signals and waits for the operation standby times can also be applied to a configuration in which any of the plurality of virtual synchronous inverters 11 in the power generation system 100 serves as a master and supplies operation control signals to the other virtual synchronous inverters 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply/demand device comprising:
   a virtual synchronous inverter connected to a power system; and
   a storage battery whose charging and discharging are controlled by the virtual synchronous inverter,
   wherein the virtual synchronous inverter
      is connected to the power system in parallel with other inverters, and
      is capable of calculating a first standby time having any length and performing control of the storage battery corresponding to an operation instruction after a lapse of the first standby time, when receiving the operation instruction accompanied by output of power to the power system or input of power from the power system.

2. The power supply/demand device of claim 1, wherein the virtual synchronous inverter
   is capable of performing the control of the storage battery corresponding to the operation instruction after the lapse of the first standby time in a case where a difference between a frequency of the power system measured when the operation instruction has been received and a frequency of the power system measured during the first standby time is equal to or smaller than a predetermined value, and
   is capable of calculating a second standby time having any length and performing the control of the storage battery corresponding to the operation instruction after a lapse of the second standby time since the calculation of the second standby time, when the difference is larger than the predetermined value.

3. The power supply/demand device of claim 2, wherein the virtual synchronous inverter is configured to measure a frequency of the power system for comparison with a frequency of the power system measured during the second standby time when calculating the second standby time.

4. The power supply/demand device of claim 1, wherein the virtual synchronous inverter is configured to generate the first standby time based on an amount of stored power of the storage battery.

5. The power supply/demand device of claim 4, wherein a method for calculating the first standby time by the virtual synchronous inverter when the operation instruction causes the storage battery to be charged is different from a method for calculating the first standby time by the virtual synchronous inverter when the operation instruction causes the storage battery to be discharged.

6. The power supply/demand device of claim 5, wherein the method for calculating the first standby time by the virtual synchronous inverter when the operation instruction causes the storage battery to be charged is configured to increase a probability of calculating a shorter time as the amount of stored power of the storage battery is smaller.

7. The power supply/demand device of claim 5, wherein the method for calculating the first standby time by the virtual synchronous inverter when the operation instruction causes the storage battery to be discharged is configured to increase a probability of calculating a shorter time as the amount of stored power of the storage battery is larger.

8. The power supply/demand device of claim 2, wherein the virtual synchronous inverter is configured to update the predetermined value according to a difference between a standard frequency of the power system and the frequency of the power system measured during the first standby time.

9. The power supply/demand device of claim 8, wherein the virtual synchronous inverter is configured to update the predetermined value to a smaller value as the frequency of the power system measured during the first standby time is closer to the standard frequency of the power system.

10. The power supply/demand device of claim 1, wherein the virtual synchronous inverter is configured to omit calculation and standby of the first standby time, and immediately start the control of the storage battery corresponding to the operation instruction when receiving an operation instruction different from an operation instruction predicted from a frequency of the power system.

11. The power supply/demand device of claim 1, wherein the virtual synchronous inverter is configured to receive the operation instruction from a control device connected in parallel with the other inverters.

12. The power supply/demand device of claim 1, wherein the virtual synchronous inverter is configured to receive the operation instruction from another inverter operating as a master among the other inverters.

13. The power supply/demand device of claim 1, wherein:
the virtual synchronous inverter is configured to control the storage battery to stabilize an amount of input or output power by periodically measuring the amount of input or output power of the power supply/demand device; and
the first standby time is a time longer than a control time of the storage battery for stabilizing the amount of input or output power.

14. The power supply/demand device of claim 1, wherein the operation instruction includes a start of charging or discharging of the storage battery whose charging or discharging is being stopped, a stop of charging or discharging of the storage battery that is being charged or discharge, a change of an amount of charging or discharging power of the storage battery, and non-charging or non-discharging.

15. The power supply/demand device of claim 1, wherein the virtual synchronous inverter is configured to continue to operate for an operation that has been executed at a point in time of receiving the operation instruction until the first standby time elapses.

16. The power supply/demand device of claim 1, wherein the other inverters include a virtual synchronous inverter.

17. A power generation system comprising:
a plurality of power supply/demand devices each including a virtual synchronous inverter and a storage battery; and
a control device configured to control the plurality of power supply/demand devices,
wherein each of a plurality of the virtual synchronous inverters included in the power supply/demand devices is connected to a power system in parallel with other virtual synchronous inverters, and
is capable of calculating a first standby time having any length, and performing control of the storage battery corresponding to an operation instruction after a lapse of the first standby time, when the operation instruction accompanied by output of power to the power system or input of power from the power system is received from the control device.

18. A control method of a power supply/demand device which comprises a virtual synchronous inverter connected to a power system in parallel with another inverter and a storage battery whose charging and discharging are controlled by the virtual synchronous inverter, the control method comprising:
calculating a first standby time having any length and performing control of the storage battery corresponding to the operation instruction after a lapse of the first standby time by the virtual synchronous inverter, when an operation instruction accompanied by output of power to the power system or input of power from the power system is received.

* * * * *